United States Patent [19]

Shinohara

[11] Patent Number: 5,050,980

[45] Date of Patent: Sep. 24, 1991

[54] ASPHERICAL SPECTACLE LENS

[75] Inventor: Toshihide Shinohara, Suwa, Japan

[73] Assignee: Seiko Epson Corporation, Tokyo, Japan

[21] Appl. No.: 466,818

[22] Filed: Jan. 18, 1990

[30] Foreign Application Priority Data

Jan. 21, 1989 [JP] Japan .................................. 1-12175
Feb. 17, 1989 [JP] Japan .................................. 1-37559
Dec. 18, 1989 [JP] Japan .................................. 1-327613

[51] Int. Cl.$^5$ .............................................. G02C 7/02
[52] U.S. Cl. ...................................... 351/167; 351/159
[58] Field of Search ...................... 351/159, 167, 177; 350/432–435

[56] References Cited

U.S. PATENT DOCUMENTS 4,279,480 7/1981 Battiol et al. ...................... 351/159
4,613,217 9/1986 Fuerter et al. .................. 351/159 X Primary Examiner—Scott J. Sugarman
Attorney, Agent, or Firm—Blum Kaplan

[57] ABSTRACT

An aspherical spectacle lens having a positive power. The lens has a front refractive surface and a rear refractive surface. The curvature of an arbitrary meridian passing through a predetermined point on the lens is a function C(r) of the distance r from the predetermined point. The first-order derivative dC/dr of the function C(r) decreases initially as the meridian moves away from the preselected point toward the edge of the lens and then the derivative increases.

14 Claims, 4 Drawing Sheets

# ASPHERICAL SPECTACLE LENS

BACKGROUND OF THE INVENTION

The present invention relates generally to the shape of the front convex surface of an aspherical spectacle lens and, in particular, to the shape of an aspherical spectacle lens having a positive power.

Generally, the front convex surfaces of spectacle lenses for correcting the refractive error in eyes have been made spherical for ease in machining the lenses. Such a lens is called a spherical lens. Generally, the refractive power of a lens is represented in diopters (D). The refractive power of a surface of a lens is defined as $$(n-1) \times \rho$$

where $\rho$ is the curvature ($m^{-1}$) of the surface and n is the refractive index of the material of the lens. The refractive power of the front refractive surface of a lens is better known as the base curve. The curvature corresponding to the base curve is hereinafter referred to as the curvature of the base curve.

Since the power of a lens is mainly determined by the refractive powers of the front surface and the rear surface of the lens, the base curve can assume various values, depending on the combination of the refractive powers for a given value of lens power. In practice, however, the base curve is restricted to a certain range by the power of the lens because of the optical performance, especially to reduce the astigmatism produced on the eye when an object is viewed through the side portion of the lens which is at a distance from the Optical axis of the lens.

One example of this is shown in FIG. 2 where the base curve is plotted on the vertical axis and the power of a lens having a refractive index of 1.50 is plotted on the horizontal axis. This graph shows the astigmatism produced when the spectacle lens is actually used and an object located 30° to the optical axis is viewed. The solid lines indicate the astigmatism produced when a distant object is viewed The numerical values adjacent the lines indicate the amounts of astigmatism Lines indicating astigmatism of 0.3 D are shown on opposite sides of a line indicating the absence of astigmatism, i.e., O D. The broken lines indicate the astigmatism produced when an object located at a short distance of 30 cm is viewed.

As can be seen from this graph, the optimum base curve giving zero astigmatism differs between when a remote object is viewed and when a close object is viewed. Accordingly, the base curve a in the hatched region is generally selected so as to be able to view remote objects and close objects alike.

Conventional lenses which have positive powers and are principally used for far-sighted persons and presbyopic persons have several disadvantages. In particular, lenses having larger powers have larger thicknesses at their centers. As the degree of the farsightedness or presbyopia increases, a lens having a base curve having larger curvatures must be employed, and the convex surface protrudes more This is not desirable from an aesthetic point of view.

FIG. 3 is a cross section of one example of such a lens. The illustrated lens has a power of +3 D and a diameter of 72 mm The lens is a generally used plastic lens having a refractive index of 1.50. The base curve is 7.5 D, and the thickness at each edge is 1.0 mm. In this example, the thickness at the center of the lens is 5.3 mm. The amount 1 by which the convex surface of the lens protrudes from the edges of the lens is 10.6 mm. If spectacles are fabricated from lenses of this construction, then the lenses are considerably thick and unsightly. One conceivable method of solving this problem is to reduce the base curve.

FIG. 4 shows a lens which is similar to the lens shown in FIG. 3 except that the base curve is 4.0 D. The thickness at the center of this lens is 4.9 mm, which is less than the thickness of the lens shown in FIG. 3 by 0.4 mm. Also, the amount of protrusion is 5.3 mm, which is half of the amount of the lens shown in FIG. 3. However, the base curve is determined from the optical performance as discussed above.

As shown by the graphs in FIGS. 5 and 6, the base curve of 4.0 D severely deteriorates the optical performance. FIGS. 5 and 6 show the astigmatism produced in the field of view when a lens having a base curve of 7.5 D and a lens having a base curve of 4.0 D are respectively used. The vertical axis indicates the angle of the field of view in degrees, while the horizontal axis represents the astigmatism in diopters, measured based on the refractive power of the sagittal direction. The astigmatism occurring in fields of view when an infinitely remote object ($\infty$), an object at a distance of 1 m, and an object at a distance of 0.3 are viewed, are shown.

To solve the above-described disadvantages, some lenses having aspherical front refractive surfaces have been proposed, as disclosed for example in Japanese Patent Laid-Open No. 136,644/1977, Japanese Patent Publication No. 15,248/1985 corresponding to U.S. Pat. No. 4,181,409, and Japanese Patent Laid-Open No. 24,112/1983 corresponding to U.S. Pat. No. 4,504,128. In the lens disclosed in Japanese Patent Laid-Open No. 136,644/1977, a meridian is formed by a quadratic curve such as an ellipse, parabola, or hyperbola. The front refractive surface is formed by an aspherical surface that is created by rotating the meridian. A plurality of lenses of this type have been suggested.

Japanese Patent Publication No. 15,248/1985 and Japanese Patent Laid-Open No. 24,112/1983 disclose lenses having large positive powers, the lenses being used for aphakial eyes. The lens disclosed in Japanese Patent Publication No. 15,248/1985 adopts an aspherical surface of revolution based on an aspherical surface of revolution of a tenth-order function of the radius r. The lens disclosed in Japanese Patent Laid-Open No. 24,112/1983 adopts an aspherical plane of revolution based on a quadratic curve. A correcting term is added to it. What is common to these conventional aspherical lenses is that the curvature of the meridian decreases substantially monotonously land acceleratingly from the axis of rotation (generally the geometrical center of the lens) toward the edges. As a result, the power of the lens is much lower in the peripheral portions than in the center. This narrows the effective field region suitable for the condition of the user's eye. Especially, a lens for an aphakial eye has a strong aspherical surface to make the lens thin and so the diameter of the effective field region is from 30 to 40 at best on the lens.

Accordingly, it is desired to provide an aspherical spectacle lens that overcomes the disadvantages of the prior art.

SUMMARY OF THE INVENTION

Generally in accordance with the present invention, an aspherical spectacle lens is provided. The lens includes a front refractive surface and a rear refractive surface. The front refractive surface is aspherical in shape with the curvature of an arbitrary meridian passing through a predetermined point on the front refractive surface being a function C(r) of the distance r from the predetermined point. The first-order derivative dC/dr of the function C(r) changes such that it first decreases as the meridian moves away from the predetermined point and then it increases.

Accordingly, it is an object of the present invention to provide an improved aspherical lens.

Another object of the present invention is to provide a spectacle lens which has a positive power and is used for farsightedness and presbyopia but does not suffer from problems in the prior art.

A further object of the present invention is to provide an aspherical spectacle lens which is excellent in optical performance, thin, and well-shaped.

Yet another object of the present invention is to provide a spectacle lens whose front refractive surface takes a special aspherical form.

Still other objects and advantages of the invention will in part be obvious and will in part be apparent from the specification.

The invention accordingly comprises an article of manufacture possessing the features, properties, and the relation of elements which will be exemplified in the article hereinafter described, and the scope of the invention will be indicated in the claims.

BRIEF DESCRIPTION OF THE DRAWINGS

For a fuller understanding of the invention, reference is had to the following description taken in connection with the accompanying drawings, in which.

DETAILED DESCRIPTION OF THE PREFERRED EMBODIMENTS

Figure 1A:
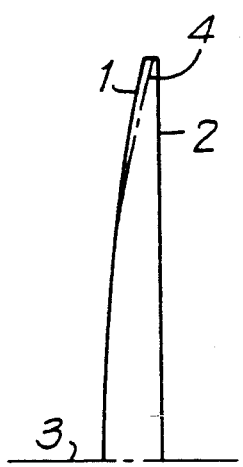
FIG. 1A is a partial cross-sectional view of a spectacle lens constructed according to the present invention, taken along a meridian of the lens.
Figure 1B:
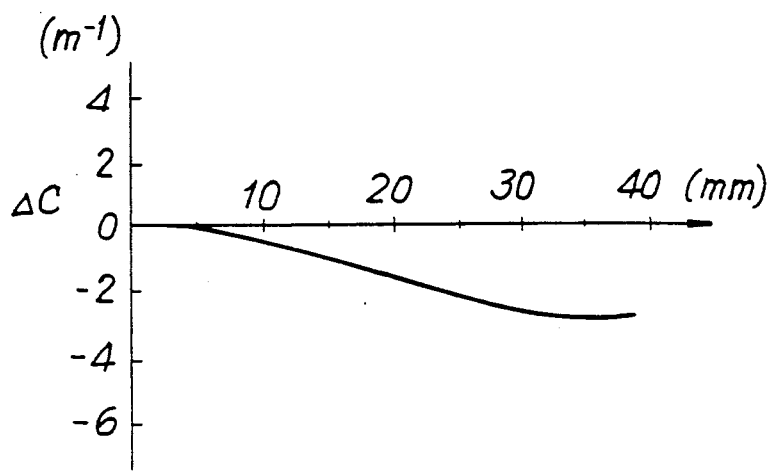
FIG. 1B is a graph which depicts the deviation of the curvature of the meridian of the lens shown in FIG. 1A from the base curve as plotted against the distance from the axis of symmetry.
Figure 1C:
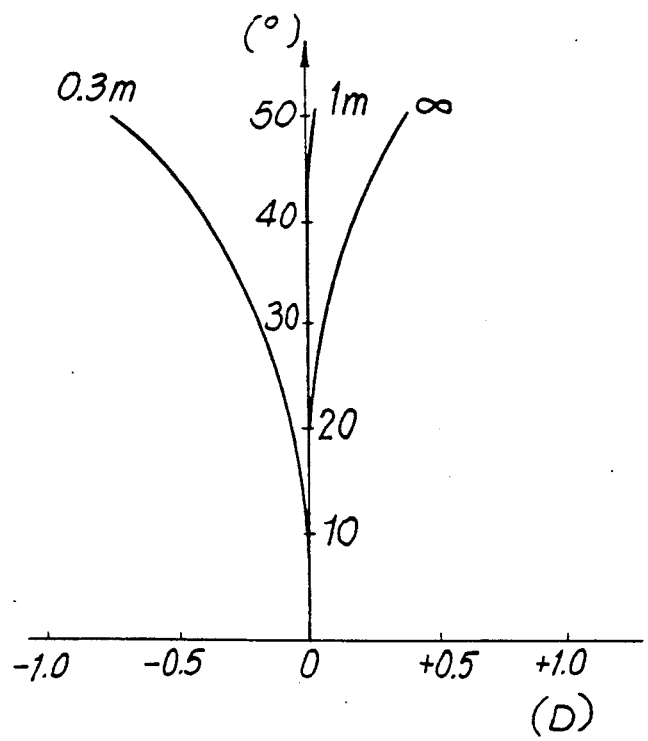
FIG. 1C is a graph which depicts the angle of field of view as plotted against the amount of astigmatism in the lens of FIG. 1A.
Figure 2:
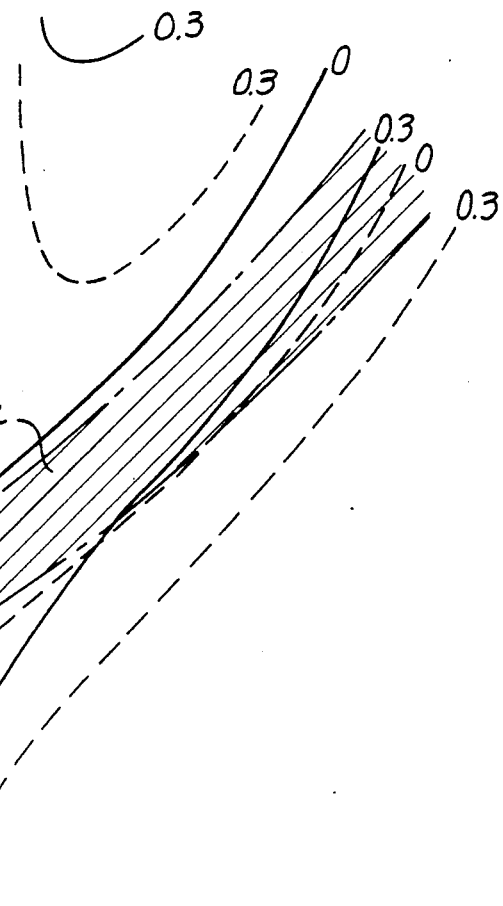
FIG. 2 is a graph showing astigmatism produced at an angle of field of view of 30° by the combination of the power of a conventional spherical lens and the base curve.
Figure 4:
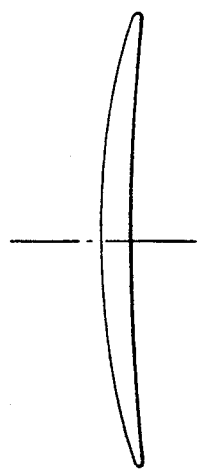
FIG. 4 is a cross-sectional view of another known spherical lens having a power of +3.0 D and a base curve of 4.0 D.
Figure 5:
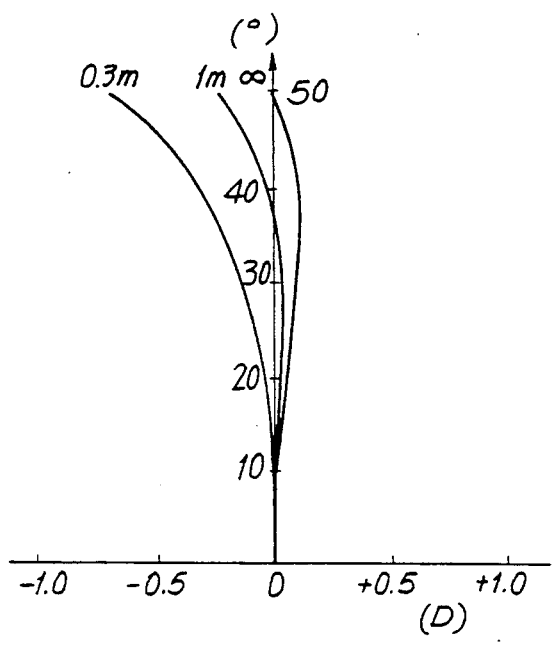
FIG. 5 is a graph which depicts the angle of the field of view of the lens shown in FIG. 3 as plotted against the amount of astigmatism.

Reference is first made to FIG. 1A which is a cross-sectional view of half of a spectacle lens according to the present invention. FIG. 1B shows the manner in which the curvature varies as a meridian goes from the center toward the edge of the lens of FIG. 1A. FIG. 1C shows the manner in which the amount of astigmatism varies in the lens of FIG. 1A. This lens is formed by applying the present invention to the lens which is shown in FIG. 4 and has a power of +3.0 D and a base curve of 4.0 D.

In FIG. 1A, the lens has a front refractive surface 1 and a rear refractive surface 2. The lens is symmetrical with respect to an axis 3. The cross section of a prior art spherical lens is indicated by the dot-and-dash line 4. This cross section is an arc having a curvature corresponding to the base curve. The front refractive surface 1 of the lens according to the present invention has the same curvature as the front surface of the prior art lens 4 proximate the axis of rotation, but the curvature of the front surface of the lens decreases as the meridian approaches the edge. As a result, the front surface is located ahead of the arc of the base curve on the edge.

FIG. 1B shows the manner in which the curvature varies on the meridian. In the graph of FIG. 1B, the deviation of the curvature from the base curve is plotted on the vertical axis and the distance from the axis of symmetry is plotted on the horizontal axis. Values of the deviation $\Delta C$ of the curvature are listed in Table 1 below.

TABLE 1

| r (mm) | $\Delta C$ (m$^{-1}$) |
|---|---|
| 0.0 | 0.00 |
| 2.5 | −0.04 |
| 5.0 | −0.15 |
| 7.5 | −0.34 |
| 10.0 | −0.57 |
| 12.5 | −0.84 |
| 15.0 | −1.12 |
| 17.5 | −1.41 |
| 20.0 | −1.68 |
| 22.5 | −1.94 |
| 25.0 | −2.16 |
| 27.5 | −2.36 |
| 30.0 | −2.52 |
| 32.5 | −2.66 |
| 35.0 | −2.74 |
| 37.5 | −2.73 |

As shown in FIG. 1B, the curvature of the meridian gradually decreases at a rate which increases as the meridian goes away from the axis of symmetry. The decreasing rate begins to drop in the region between the distance of 15 mm and the distance of 20 mm. After a distance of 35 mm has been reached, the rate is substantially constant, or the curvature begins to increase slightly. This is now discussed further in mathematical terms.

Let the curvature be a function C(r) of the distance r from the axis of symmetry. The first-order derivative dC/dr starts from 0 on the axis of symmetry and decreases gradually as the meridian moves away from the axis. The derivative assumes its minimum value at a distance of 15 to 20 mm and then it increases. By changing the curvature in this way, the front refractive surface takes the form shown in FIG. 1A. Consequently, the thickness at the center can be reduced as compared with the thickness of the prior art lens. At the same time, the protrusion of the front refractive surface can be reduced.

Figure 3:
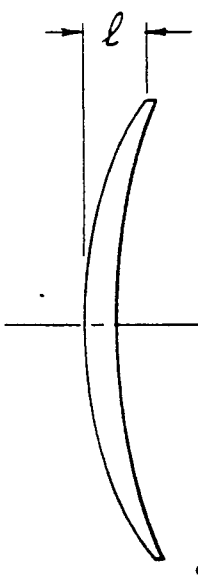
FIG. 3 is a cross-sectional view of a known spherical lens having a power of +3.0 D and a base curve of 7.5 D.
Figure 6:
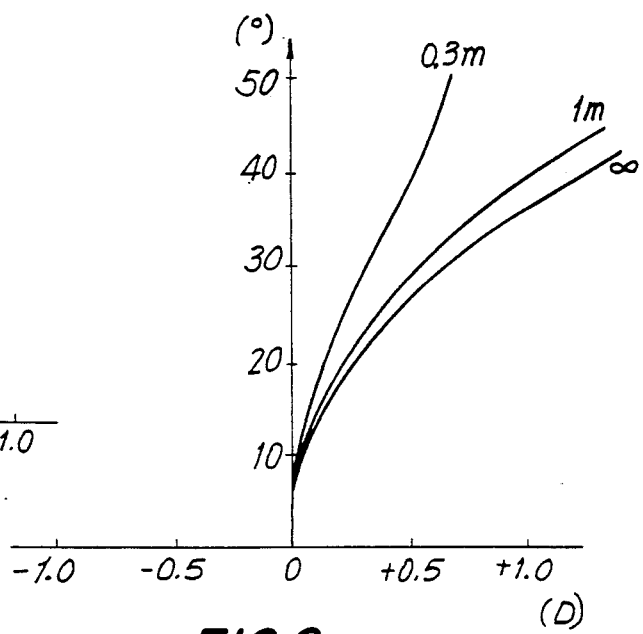
FIG. 6 is a graph which depicts the angle of the field of view of the lens shown in FIG. 4 as plotted against the amount of astigmatism.

In this specific example, the thickness at the center of the lens is 4.3 mm, and the amount of protrusion is 4.7 mm. Hence, a reduction of 0.6 mm in the thickness at the center and a reduction of 5.9 mm in the amount of protrusion have been achieved as compared with the prior art spherical lens shown in FIG. 3. Thus, the lens according to the present invention is made much thinner and flatter than the prior art lens. In the spherical lens, a large amount of astigmatism remains, though the base curve is reduced to 4.0 D, as shown in FIG. 6. In the present lens, the amount of astigmatism is reduced greatly as shown in FIG. 1C.

Figure 7:
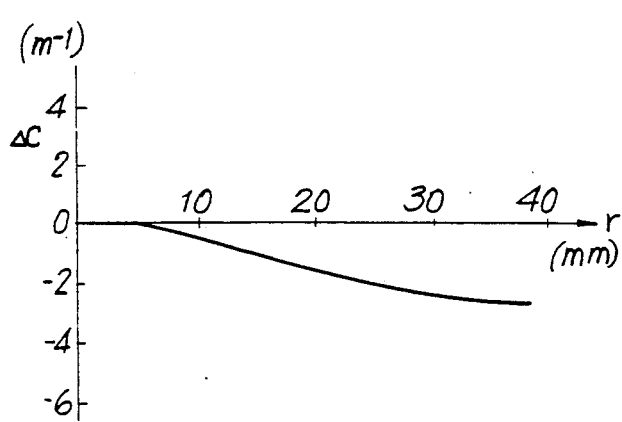
FIG. 7 is a graph showing the changes in the curvature of a meridian of a second spectacle lens according to the present invention.
Figure 8:
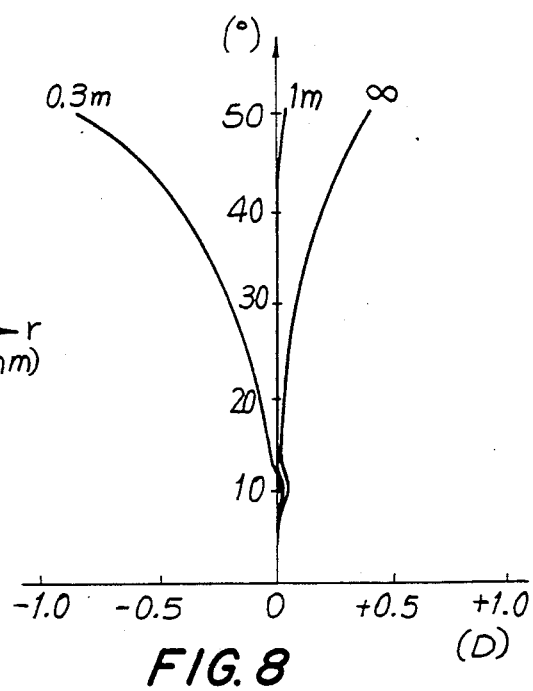
FIG. 8 is a graph which depicts the angle of the field of view as plotted against the amount of astigmatism produced by the lens referenced in FIG. 7.

Another spectacle lens according to the present invention is next described by referring to FIGS. 7 and 8. This lens has a power of +3.0 D and a base curve of 4.0 D in the same way as the lens already described in connection with FIGS. 1A-1C. FIG. 7 shows the deviation Δ C of the curvature on a meridian. Values of the deviation are listed in Table 2 below.

TABLE 2

| r (mm) | ΔC (m⁻¹) |
|---|---|
| 0.0 | 0.00 |
| 2.5 | 0.00 |
| 5.0 | 0.00 |
| 7.5 | −0.27 |
| 10.0 | −0.50 |
| 12.5 | −0.77 |
| 15.0 | −1.06 |
| 17.5 | −1.35 |
| 20.0 | −1.63 |
| 22.5 | −1.89 |
| 25.0 | −2.12 |
| 27.5 | −2.32 |
| 30.0 | −2.49 |
| 32.5 | −2.62 |
| 35.0 | −2.71 |
| 37.5 | −2.70 |

As can be seen from Table 2, in this example, the curvature does not change at all in the region between the center and the distance of 5 mm. In other words, the central portion having a radius of 5 mm is a spherical surface. In the region beginning with the end of this spherical portion and ending with the edge, the curvature changes in the same ay athe lens described already in conjunction with FIG. 1A-1C. Thus, as shown in FIG. 8, the astigmatism increases in the central spherical portion due to reductions in the base curve. Outside of this portion, the astigmatism is reduced by making the surface aspherical, in the same way as the first embodiment described above. The base curve and the size of the central spherical portion are so adjusted that the amount of increase in the astigmatism in the central portion is restricted to between 0.1 and 0.15 D. This permits the lens to be used without hindrance to the vision. At this time, the thickness at the center is 4.4 mm and the amount of protrusion is 4.8 mm. These values are somewhat inferior to the values obtained by the first embodiment, but this second embodiment still realizes a great reduction in the thickness and gives rise to a flattened lens.

The second embodiment has the following advantages over the first embodiment. When the power of the lens is measured, stable results are obtained. Specifically, when the power of the lens of the first embodiment is measured on the optical axis (usually coincident with the axis of symmetry) with a lens meter, if the position at which the measurement is made deviates at all from the correct position, then the power will not be correctly measured, or unwanted astigmatic aberrations will be introduced, because the lens is totally aspherical, i.e., has no spherical surface at the center. The provision of a spherical surface at the center solves these problems. One who compares FIG. 1C with FIG. 8 may wonder if the situation is opposite. These two figures show the astigmatism occurring in the region between the center and the edge when the lens is actually used. When the power is measured with lens meter, the light rays pass at different angles and, therefore, it seems if the situation were switched between FIG. 1C and FIG. 8.

A request for decentration can be fulfilled in the same way as an ordinary lens having a spherical front refractive surface. In particular, the central spherical portion produces a given power more stably than a lens having a totally aspherical surface. If the lens is decentered within this range, then the desired power can be derived stably, unlike a lens having a totally aspherical surface.

In order to obtain these advantages, it is necessary that the central spherical portion be at least 3 mm in radius, preferably more than 5 mm, because the opening in a normally used lens meter is 5 to 10 in diameter.

Figure 9:
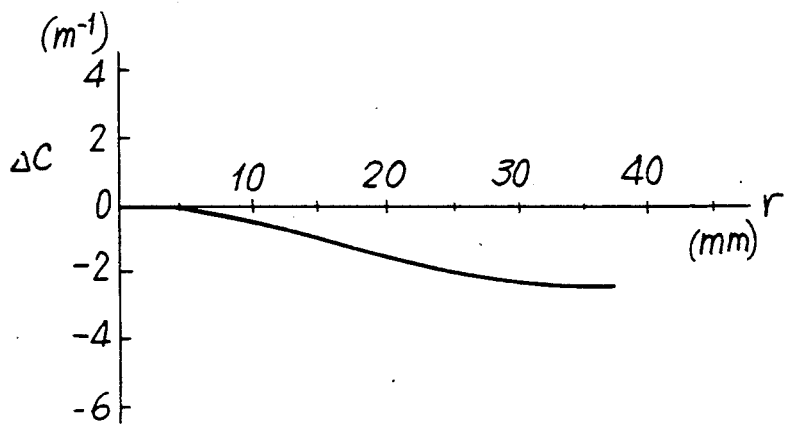
FIG. 9 is a graph showing the changes in the curvature of a meridian of another spectacle lens according to the present invention.

A further spectacle lens according to the present invention is next described by referring to FIG. 9. This lens has a power of +3.0 D, a base curve of 4.0 D, and a diameter of 72 mm, in the same way as the second embodiment. However, this third embodiment has a refractive index of 1.60 and an Abbe number of 35, which are different from those of the first embodiment. FIG. 9 shows the deviation Δ C of the curvature on a meridian. Values of the deviation are listed in Table 3 below.

TABLE 3

| r (mm) | ΔC (m⁻¹) |
|---|---|
| 0.0 | 0.00 |
| 2.5 | 0.00 |
| 5.0 | 0.00 |
| 7.5 | −0.24 |
| 10.0 | −0.49 |
| 12.5 | −0.75 |
| 15.0 | −1.02 |
| 17.5 | −1.29 |
| 20.0 | −1.55 |
| 22.5 | −1.79 |
| 25.0 | −2.01 |
| 27.5 | −2.19 |
| 30.0 | −2.35 |
| 32.5 | −2.48 |
| 35.0 | −2.58 |
| 37.5 | −2.55 |

In this embodiment, the thickness at the center of the lens is 3.7 mm, and the amount of protrusion is 3.9 mm. The thickness is smaller by 1.6 mm (30%) and the amount of protrusion is smaller by 6.7 mm (63%) than those of the conventional spherical lens shown in FIG. 3. Since the material of the lens has a higher refractive index, the thickness at the center and the amount of protrusion are reduced by 0.7 mm and 0.9 mm, respectively, as compared with the second embodiment.

Figure 10:
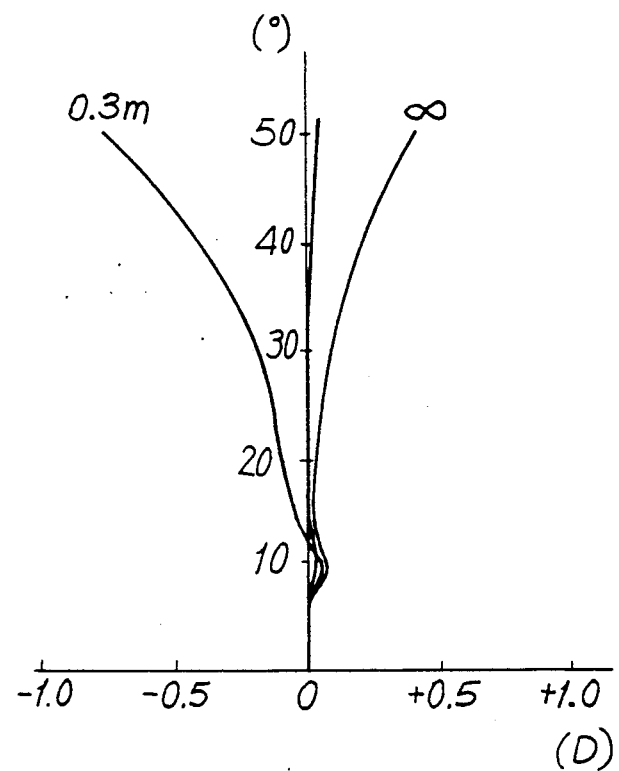
FIG. 10 is a graph which depicts the angle of the field of view as plotted against the amount of astigmatism produced by the lens referenced in FIG. 9.

The astigmatism of this lens is shown in FIG. 10 and exhibits good characteristics similarly to the second embodiment shown in FIG. 8. As can be seen from the graphs of FIGS. 1C, 8 and 10 concerning astigmatism, thee three lenses are designed so that the astigmatism produced when an object located at a distance of 1 m is viewed is reduced substantially down to zero, i.e., the lenses are designed for intermediate vision. Also, the lenses can be so designed that the astigmatism occurring when a remote object is viewed is fully eliminated, i.e., the lenses are designed for remote vision. The lenses can be designed in such a way that the astigmatism produced when an object located at a short distance of about 30 cm is removed, i.e., the lenses are designed for close vision. In any case, the same inventive theory is utilized. In a lens designed for close vision, the curvature is changed to a greater extent than in the above-described examples. Conversely, in a lens deigned for close vision, the curvature is changed to a lesser extent. The present inventor has confirmed that in a lens designed for remote vision, when the lens is actually used and a remote object is viewed, the lateral portions are somewhat insufficiently corrected as compared with the desired power, i.e., the power on the optical axis. Conversely, in a lens designed for close vision, when a remote object is viewed, the lateral portions are somewhat excessively corrected. For general use, lenses are preferably designed for intermediate vision to view an object at a distance of about 1 m.

As described thus far, the spectacle lens according to the present invention having a positive power has a reduced thickness at the center and a less protruding front refractive surface. Also, the optical performance is improved. With respect to the improvement on the optical performance, the curvature of a meridian of the prior art aspherical lens changes monotonously and acceleratingly toward the edge. The discovered effective method consists in once reducing the first-order derivative of the curvature C(r) as the meridian moves away from the axis of symmetry of the lens and then increasing the derivative. By changing the curvature are described above, astigmatism can be controlled well over the whole range of the lens irrespective of the distance to the viewed object. Since the power of the lens does not drop greatly in the peripheral portions, a wide field of view is secured.

The aspherical shape whose radius of curvature changes as described above is combined with a low base curve that is not adopted for an ordinary spherical lens because of the optical performance, to thereby realize a spectacle lens which is excellent in optical performance, has a small thickness at its center, is flat, and well-shaped. In the present invention, the base curve is the curvature near the axis of symmetry. The base curve is made low such that the following relation is satisfied:

$$(n-1) \times \rho_o \leqq 0.5 \times S + 5$$

where n is the refractive index of the material of the lens, $\rho_o$ is the curvature near the axis of rotation, i.e., the curvature of the base curve, and S is the equivalent spherical power (in diopters).

As described in the third embodiment, a material having a high refractive index is combined with the above-described aspherical shape. As a result, greater merits are obtained. In the field of plastic spectacle lenses, refractive indices exceeding 1.55 are called medium refractive indices or high refractive indices. The normal refractive index is 1.50.

Generally, materials having high refractive indices have small Abbe numbers. In the case of plastic materials having refractive indices exceeding 1.55, the Abbe numbers are under approximately 40. Therefore, where an object is viewed through a peripheral portion of the lens, light is dispersed by prismatic action of the lens, resulting in colored fringes surrounding the image. This defect is called chromatic aberration. However, in a lens having an aspherical surface according to the present invention, the wedge-like portion formed around the edge by the front refractive surface and the rear refractive surface as shown in FIG. 1A is smaller than the wedge-like portion of a spherical lens. That is, the prismatic action decreases to thereby reduce chromatic aberration.

The spherical portion formed in the center stabilizes the power of the lens. Also, the novel lens is easy to machine. Further, the lens can be decentered.

Figure 11:
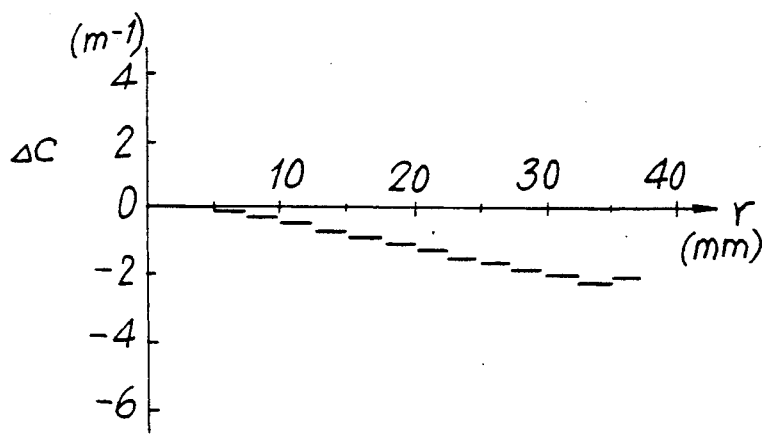
FIG. 11 is a graph showing the changes in the curvature of a meridian of still another spectacle lens according to the present invention.

In the first and second embodiments described above, the curvature of the front refractive surface changes continuously. It is to be understood that changes and modifications can be made thereto. For example, as shown in FIG. 11, the curvature is changed in a stepwise fashion as the meridian moves away from the axis of rotation. Also, the curvature may be changed subtly, as along as the radius of curvature is varied similarly to the above-described embodiments of the invention.

In all of the embodiments described thus far, the aspherical surface is symmetrical with respect to the axis of rotation, but the rotation symmetry is not essential to the invention. If the shape of the meridian extending from a certain point, e.g., the geometrical center, on the front refractive surface of the lens, toward the edge differs according to direction, the lens falls within the scope of the invention, provided that the curvature changes essentially in the manner described above.

It will thus be seen that the objects set forth above among those made apparent from the preceding description, are efficiently attained and, since certain changes may be made in the above article without departing from the spirit and scope of the invention, it is intended that all matter contained in the above description and shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed is:

1. An aspherical spectacle lens having a positive power comprising a front refractive surface and a rear refractive surface, the front refractive surface being aspherical in shape and convex, the curvature of an arbitrary median passing through a predetermined point on the front refractive surface being a function C(r) of the distance r from the predetermined point, the first-order derivative dC/dr of the function C(r) changing such that it first decreases as the meridian moves away from the predetermined point and then it increases.

2. The aspherical spectacle lens as claimed in claim 1, wherein said front refractive surface is symmetrical with respect to an axis of rotation passing through said predetermined point.

3. The aspherical spectacle lens as claimed in claim 2, wherein said lens has an edge, the curvature of said front refractive surface remaining constant as the meridian moves at least 3 mm towards such edge from said predetermined point and then the curvature decreases.

4. The aspherical spectacle lens as claimed in claim 2, wherein said lens has an edge, the curvature of said front refractive surface remaining constant as the meridian moves to more than 5 mm towards such edge from said predetermined point and then the curvature increases.

5. The aspherical spectacle lens as claimed in claim 2, wherein the following relation is satisfied:

$$(n-1) \times \rho_o \leq 0.5 \times S + 5,$$

where $\rho_o$ (m$^{-1}$) is the value of the curvature of the meridian near said predetermined point, S (in diopters) is the equivalent spherical power of the lens, and n is the refractive index of the material forming the lens.

6. The aspherical spectacle lens as claimed in claim 2, wherein the refractive index of the material forming the lens is equal to or greater than 1.55 and the Abbe number is equal to or less than 40.

7. The aspherical spectacle lens as claimed in claim 1, wherein said predetermined point is the geometrical center of the lens.

8. An aspherical spectacle lens comprising a front refractive surface and a rear refractive surface, the front refractive surface being aspherical in shape, the curvature of an arbitrary meridian passing 9. The aspherical spectacle lens as claimed in claim 8, wherein the following relation is satisfied:

$$(n-1) \times \rho_o \leq 0.5 \times S + 5,$$

where $\rho_o$ (m$^{-1}$) is the value of the curvature of the meridian near said predetermined point, S (in diopters) is the equivalent spherical power of the lens, and n is the refractive index of the material forming the lens. through a predetermined point on the front refractive surface being a function C(r) of the distance r from the predetermined point, the first-order derivative dC/dr of the function C(r) changing such that it first decreases as the meridian moves away from the predetermined point and then it increases, said lens has an edge, the curvature of said front refractive surface remaining constant as the meridian moves at least 3 mm towards such edge from said predetermined point and then the curvature decreases.

10. The aspherical spectacle lens as claimed in claim 8, wherein the refractive index of the material forming the lens is equal to or greater than 1.55 and the Abbe number is equal to or less than 40.

11. An aspherical spectacle lens comprising a front refractive surface and a rear refractive surface, the front refractive surface being aspherical in shape, the curvature of an arbitrary meridian passing through a predetermined point on the front refractive surface being a function C(r) of the distance r from the predetermined point, the first-order derivative dC/dr of the function C(r) changing such that it first decreases as the meridian moves away from the predetermined point and then it increases, said lens has an edge, the curvature of said front refractive surface remaining constant as the meridian moves to move than 5 mm towards such edge from said predetermined point and then the curvature decreases.

12. An aspherical spectacle lens comprising a front refractive surface and a rear refractive surface, the front refractive surface being aspherical in shape, the curvature of an arbitrary meridian passing through a predetermined point on the front refractive surface being a function C(r) of the distance r from the predetermined point, the first-order derivative Dc/dc of the function C(r) changing such that it first decreases as the meridian moves away from the predetermined point and then it increases, so that the following relation is satisfied:

$$(n-1) \times \rho_o \leq 0.5 \times S + 5,$$

wherein $\rho_o$ (m$^{-1}$) is the value of the curvature of the meridian near said predetermined point, S (in diopters) is the equivalent spherical power of the lens, and n is the refractive index of the material forming the lens.

13. The spherical spectacle lens as claimed in claim 12, wherein the refractive index of the material forming the lens is equal to or greater than 1.55 and the Abbe number is equal to or less than 40.

14. An aspherical spectacle lens comprising a front refractive surface and a rear refractive surface, the front refractive surface being aspherical in shape, the curvature of an arbitrary meridian passing through a predetermined point on the front refractive surface being a function C(r) of the distance r from the predetermined point, the first-order derivative dC/dr of the function C(r) changing such that it first decreases as the meridian moves away from the predetermined point and then it increases, wherein the refractive index of the material forming the lens is equal to or greater than 1.55 and the Abbe number is equal to or less than 40.

* * * * *